United States Patent Office

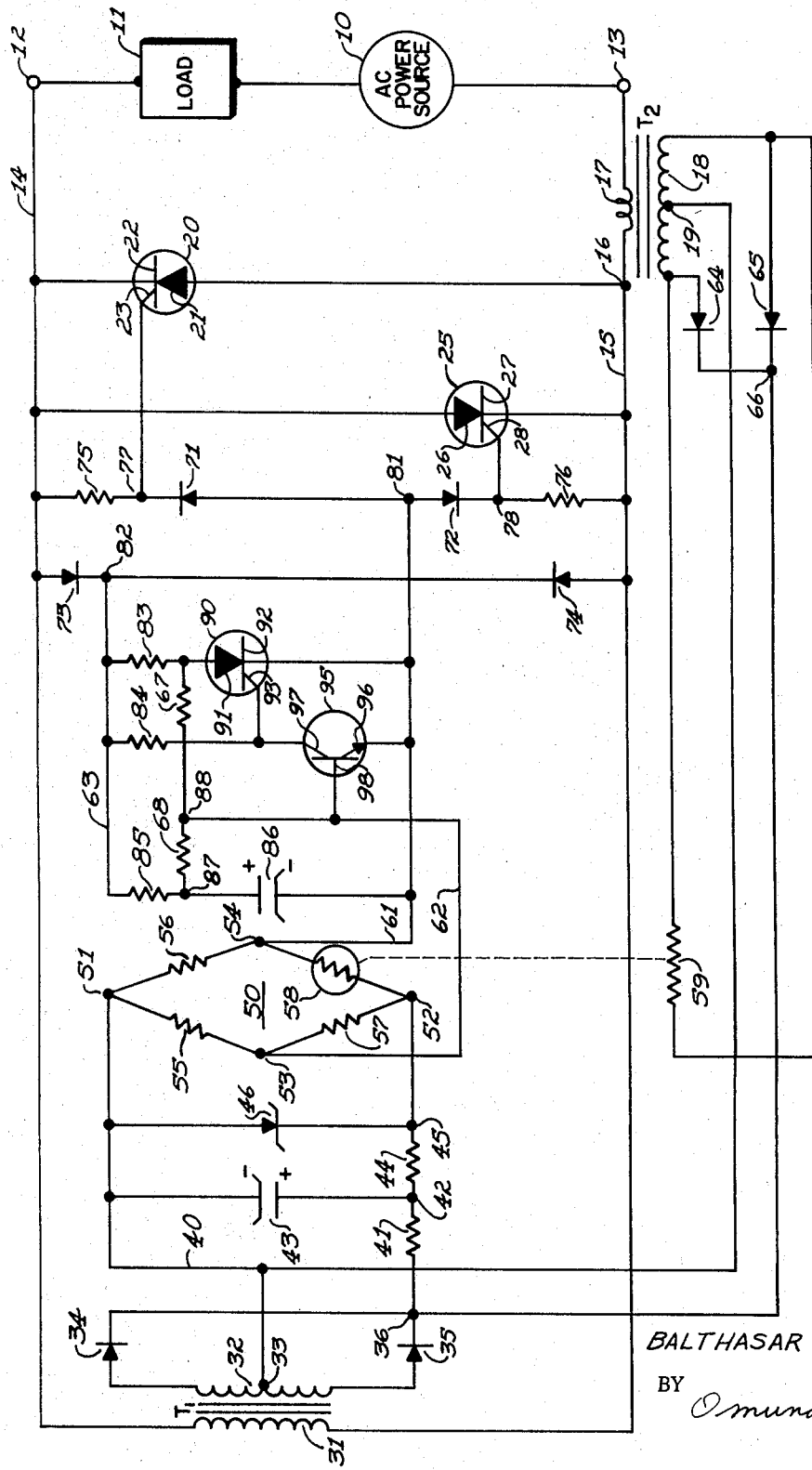

3,372,328
Patented Mar. 5, 1968

3,372,328
SCR TEMPERATURE CONTROL CIRCUIT
Balthasar H. Pinckaers, Edina, Minn., assignor to Honeywell Inc., a corporation of Delaware
Filed Nov. 24, 1964, Ser. No. 413,431
8 Claims. (Cl. 323—22)

ABSTRACT OF THE DISCLOSURE

A solid state thermostat having only two input wires in which both a voltage transformer and a current transformer are used to sequentially provide power to the thermostat. The power contacts of the thermostat comprise a bidirectional solid state controlled rectifier means. A primary winding of a current transformer is serially connected with the power contacts across the two wire AC input terminals. The AC source and load are connected to these terminals. A voltage transformer primary winding is connected across the power contacts. The voltage transformer or the current transformer provides power, depending on whether the contacts are open or closed, to a temperature-responsive bridge circuit which provides a signal to close the contacts.

---

This invention is concerned with control apparatus and more particularly with a two-wire semiconductor condition responsive control device for use with alternating power supplies.

With the advent of semiconductor switching devices there have been numerous control circuits developed in which functions normally performed by mechanical or electromechanical contacts are now performed by semiconductor "contacts." A particularly desirable device in which it is advantageous to replace mechanical with semiconductor contacts is a remote condition control device such as a thermostat or humidistat responsive to changes in environmental conditions. A number of such devices have used semiconductor switches connected across the usual source of AC voltage. These devices often have power supply means connected directly across the switches so that when the switch closes the power supplied is shunted. This has required either a third lead for allowing power to remain across the power supply, or the use of some power storage means such as a capacitor to take over when the main power supply is shorted out. The three wire device is undesirable from the practical standpoint in that the cost of running the extra wire and the accompanying need for additional circuitry is significant. The use of an energy storage device to provide power when the main power supply is shorted required special sequencing in the device to assure that the storage means is sufficiently charged and is recharged during the period the semiconductor switch is on, which again adds an undesirable element to the use of this method.

It is a purpose of this invention to provide a two-wire condition control device with a new means of overcoming the loss of the main power supply when a semiconductor switch within the device is turned on. The apparatus of this invention involves a pair of parallel-inverse connected controlled rectifiers forming a semiconductor switch. A main power supply comprising a transformer-rectifier-voltage regulator combination is employed, in which the primary winding of the transformer is connected across the semiconductor switch. A signal forming means including a condition responsive bridge is connected between the voltage regulator and the semiconductor switch to provide control signals to the semiconductor switch. Under prior art conditions the semiconductor switch may have been directly connected across the two-wire input, however, when the switch turned on, power to the transformer primary would be substantially removed and there would have been no power to the signal forming means to allow continued operation of the switch. In the apparatus of this invention a control transformer is employed which has a low impedance primary winding and a secondary winding connected through further rectification means to the voltage regulator. The low impedance primary winding is connected in series with the semiconductor switch across the two-wire input. Thus, when the semiconductor switch is not "on," substantially full supply voltage exists across the primary winding of the main power supply transformer. When the semiconductor switch does turn on the increased current through the current transformer primary winding will induce a voltage in the current transformer secondary winding, which will take over the function performed by the main power supply transformer when the semiconductor switch was "off."

It is therefore an object of this invention to provide a two-wire condition control apparatus having a semiconductor switch, in which a main power supply provides power to signal means for the switch when the switch is off, and in which a secondary power supply is present to provide power to the signal means when the switch is on.

It is another object of this invention to provide a two-wire condition control device having a semiconductor switch in which a voltage transformer connected across the switch provides power to signal means in the device when the switch is off, and in which a current transformer connected in series with the switch provides power to the signal means when the switch is on.

It is a further object of this invention to provide a two-wire thermostat having a condition responsive bridge providing a gate signal for a semiconductor switch, in which a voltage transformer having a primary winding connected across the switch provides power to the bridge when the switch is off, and in which a current transformer having a primary winding serially connected with the switch across the two-wire input provides power to the bridge when the switch is on.

It is yet another object of this invention to provide a two-wire AC thermostat having a semiconductor switch and in which a regulated power supply provides power to a temperature responsive bridge that provides a control signal to the semiconductor switch, and in which a voltage transformer having a primary winding connected across the semiconductor switch provides power to the voltage regulator when the switch is off, and in which a current transformer having a primary winding serially connected with the switch across the two-wire AC input provides power to the voltage regulator when the switch is on and in which a heater for providing heat anticipation to the temperature responsive bridge is connected to the current transformer so as to provide anticipatory heat when the switch is on.

These and other objects of this invention will become apparent upon consideration of the accompanying claims, specification and drawings, of which:

The single figure of the drawing is a schematic representation of a preferred embodiment of the two-wire thermostat of this invention employing a voltage transformer, a current transformer, and a heater.

In the single figure of the drawing there is disclosed an AC power source 10 and a load 11 serially connected across a pair of power input terminals 12 and 13. A lead wire 14 is connected to terminal 12. There is also shown a current transformer T2 having a low impedance primary winding 17 and a secondary winding 18. Primary winding 17 is connected between a terminal 13 and a junction 16. A lead wire 15 is connected to junction 16. There is also shown a pair of parallel-inverse or back-to-back connected controlled rectifiers 20 and 25. Controlled rectifier 20 has an anode 21, a cathode 22 and a gate 23. Controlled rectifier 25 has an anode 26, a cathode 27 and a gate 28. Anode 26 and cathode 22 are connected to lead wire 14, anode 21 and cathode 27 are connected to lead wire 15, to thus place the controlled rectifiers 20 and 25 in parallel-inverse relation.

There is also shown a voltage transformer T1 having a primary winding 31 and a secondary winding 32. Primary winding 31 is connected between lead wires 14 and 15, to thus place primary winding 31 in parallel with the controlled rectifiers 20 and 25. Secondary winding 32 of transformer T1 is connected to a full wave rectifier comprising a diode 34 and a diode 35 each connected from one end of secondary winding 32 to a junction 36. A resistor 41 is connected between junction 36 and a junction 42. A center-tap 33 on secondary winding 32 of transformer T1 is connected to a lead wire 40. A capacitor 43 is connected between junction 42 and lead wire 40. A resistor 44 is connected between junction 42 and a junction 45. A voltage regulating diode, here shown as Zener diode 46, is connected between junction 45 and lead wire 40. Resistor 41, capacitor 43, resistor 44, and diode 45 comprise a voltage regulator.

There is also shown a condition responsive four-leg bridge 50 having input terminals 51 and 52, and output terminals 53 and 54. Input terminals 51 and 52 are connected between junction 45 and lead wire 40, to thus place the bridge across the regulated voltage output of the voltage regulator. The four arms of the condition responsive bridge 50 comprise a resistor 55 connected between input terminal 51 and output terminal 53, a resistor 56 connected between input terminal 51 and output terminal 54, a resistor 57 connected between input terminal 52 and output terminal 53, and a temperature sensitive resistor 58 connected between input terminal 52 and output terminal 54. Associated with temperature sensitive resistor 58 is a heater 59 which is connected across secondary winding 18 of current transformer T2.

Secondary winding 18 of current transformer T2 is also connected to a full wave rectifier comprising diodes 64 and 65, each connected between one end of secondary winding 18 and a junction 66. Junction 66 is connected to junction 36. A center-tap 19 on secondary winding 18 is connected to lead wire 40. It is thus apparent that the voltage regulator input is connected to the output of voltage transformer T1, and to the output of current transformer T2.

There is also shown a full wave bridge rectifier comprising diodes 71, 72, 73 and 74, and having in one each of two arms a resistor 75 and a resistor 76. Serially connected between lead wires 14 and 15 is a sequential combination of resistor 75, diode 71, diode 72, and resistor 76. Also serially connected between lead wires 14 and 15 to complete the bridge rectifier are diodes 73 and 74. A junction 77 between resistor 75 and diode 71 is connected to gate 23 of controlled rectifier 20. A junction 78 between diode 72 and resistor 76 is connected to gate 28 of controlled rectifier 25. A lead wire 61 is connected to a junction 81 between diodes 71 and 72. A lead wire 63 is connected to a junction 82 between diodes 73 and 74. Lead wire 61 is connected to output terminal 54 of condition responsive bridge 50. A lead wire 62 is connected to output terminal 53 of bridge 50.

There is also shown a third controlled rectifier 90 having an anode 91, a cathode 92 and a gate 93. A resistor 83 is connected between lead wire 63 and anode 91. Cathode 92 is connected to lead wire 61. A resistor 84 is connected between lead wire 63 and gate 93. A resistor 85 and a capacitor 86 are serially connected between lead wires 63 and 61. A serial combination of a resistor 67 and a resistor 68 is connected between anode 91 and a junction 87 between resistor 85 and capacitor 86. There is also shown a transistor 95, here shown as an NPN transistor, having an emitter 96, a collector 97 and a base 98. Emitter 96 is connected to lead wire 61, while collector 97 is connected to gate 93, and base 98 is connected to lead wire 62. Base 98 is also connected to a junction 88 between resistors 67 and 68.

The operation of the single figure of the drawing may best be understood by first assuming that the semiconductor bidirectional or AC switch comprising parallel-inverse connected controlled rectifiers 20 and 25 is off. Assuming that the embodiment represents a temperature responsive control apparatus, this means that the ambient temperature is such that the ouput of the bridge is not sufficient to create an "on" signal for the controlled rectifiers 20 and 25. In this case substantially all the voltage from AC power source 10 will be present across primary winding 31 of transformer T1, since its impedance is much greater than that of primary winding 17 of current transformer T2. This will cause an AC voltage to be present across secondary winding 32 of transformer T1, which will be rectified by diodes 34 and 35 and fed through resistor 41 to the voltage regulator comprising capacitor 43 and diode 46. The resulting regulated DC output voltage will be present across input terminals 51 and 52 of bridge 50.

At the same time, the AC voltage across primary winding 31 will be present across the full wave bridge rectifier comprising diodes 71, 72, 73 and 74. As a result a pulsating DC voltage will appear between junctions 81 and 82 which comprise the output of the bridge rectifier. With the polarization of the diodes as shown, junction 82 will be positive with respect to junction 81. Therefore a forward bias voltage will be present from anode 91 to cathode 92 of controlled rectifier 90. Also, a forward bias will be present from collector 97 to emitter 96 of NPN transistor 95. If this situation has been existing for a period of time, capacitor 86 will have charged to the polarity as shown, that is, with the plate connected to junction 87 being positive. This voltage stored in capacitor 86 will cause a positive biasing of the base 98 of transistor 95. There will be a current flow from the positive plate of capacitor 86 through junction 87, resistor 68, junction 88, from base 98 to emitter 96 of transistor 95, and back to the negative plate of capacitor 86. In addition there will be a positive bias current flow from junction 82 through resistor 83, resistor 67, from base 98 to emitter 96, and back to junction 81. These forward bias base currents are sufficient to cause the transistor 95 to turn on, and thus a current will flow from junction 82, through resistor 84, from collector 97 to emitter 96 of transistor 95 and back to junction 81. The effect of the turn on of transistor 95 is to short the gate input to controlled rectifier 90 and prevent controlled rectifier 90 from turning on. With controlled rectifier 90 turned off, there is not a sufficient source of signal current to gate on either of controlled rectifiers 20 and 25. The thermostat is therefore in the off or standby condition, with voltage transformer T1 supplying the power to the voltage regulator which supplies regulated power for bridge 50.

Now assume that the ambient temperature surrounding the thermostat decreases. As a result, the temperature responsive resistor 58 having a positive temperature coefficient, will decrease in resistance. The well known result in a Wheatstone bridge of this type is that output terminal 54 will become more positive with respect to output terminal 53, due to the decreased voltage drop across temperature responsive resistor 58. As the ambient temperature continues to decrease output terminal 54 will continue to become more positive with respect to output terminal 53. The result is a reverse bias current for transistor 95 which flows from output terminal 54, through lead wire 61, from emitter 96 to base 98 of transistor 65, and back through lead wire 62 to output terminal 53. Note here that the collector to emitter voltage across transistor 95 is a pulsating DC voltage which rises to a peak and returns to zero during each half cycle of AC power source 10. The resistor 68 and capacitor 86 are chosen such that the discharge of capacitor 86 will be slow enough such that under normal conditions the remaining charge on capacitor 86 following a return to zero of the pulsating voltage will be sufficient to again bias on transistor 95 when the pulsating voltage starts to rise. The positive bias base current flowing through resistors 83 and 67, on the other hand, will disappear each time the pulsating voltage goes to zero and will not be significant until the pulsating voltage has again risen to a significant value. Therefore, each time the pulsating voltage falls to zero and again starts to rise, a decision must be made between the forward bias current from capacitor 86 and the reverse bias current from birdge 50, as to whether the transistor 95 will be turned on. Under normal conditions of a desired ambient temperature, the reverse bias current from bridge 50 will not be sufficient to overcome the forward bias current from capacitor 86 and transistor 95 will turn on to be held on by the current flow through resistors 83 and 67. However, in the situation above described, where the ambient temperature has decreased sufficiently to cause a significant increase in the reverse bias current from the bridge 50, the current flow from the bridge 50 will be sufficient to keep transistor 95 off as the pulsating voltage begins to rise.

If transistor 95 is thus held off during the rise of a new pulse of voltage, the gate input to controlled rectifier 90 will not be shunted. A current will therefore flow from junction 82, through resistor 84, from gate 93 to cathode 92 of controlled rectifier 90, and back to junction 81. This will result in a turn on of controlled rectifier 90, and once turned on controlled rectifier 90 will remain on as long as a sufficient positive voltage is present from anode 91 to cathode 92, that is, during substantially all of the remainder of the existing pulse of voltage. The turn on of controlled rectifier 90 also causes the current flow through resistor 83 to be substantially shunted across the transistor 95. That is, there will no longer be sufficient current flow through resistor 67 to base 98 of transistor 95 to turn on transistor 95. Further, the turn on of controlled rectifier 90 sufficiently shunts the parallel combination of resistor 85 and capacitor 86 to prevent significant charging of capacitor 86. Thus, following the subsequent return to zero of the DC voltage, since there will not as yet have been a significant change in the output of the bridge 50, and there will have been a significant change in the charge of capacitor 86, the decision to keep the transistor 95 off will be more easily made, and the controlled rectifier 90 will again turn on. This decision to turn on controlled rectifier 90 will continue until the ambient temperature has varied to change the output of bridge 50, which condition will be more fully described below.

When controlled rectifier 90 is on, first assuming that at that time terminal 12 is positive with respect to terminal 13, there will be a current flow from terminal 12, through lead 14, through diode 73, junction 82, resistor 83, controlled rectifier 90, junction 81, diode 72, junction 78, resistor 76, lead 15, junction 16, primary winding 17 of current transformer T2, and back to terminal 13. This current flow through resistor 76 will cause a voltage drop resulting in a gate-on current flow from resistor 76 through junction 78, from gate 28 to cathode 27 of controlled rectifier 25 and back to resistor 76. This gate current will result in the turn on of controlled rectifier 25, and as a result of terminal 12 being positive with respect to terminal 13 there will be a current flow from terminal 12 through lead 14, from anode 26 to cathode 27 of controlled rectifier 25, through lead 15, junction 16, primary winding 17, and back to terminal 13. If terminal 13 is positive with respect to terminal 12 it can be seen that a similar current flow will result in a voltage drop across resistor 75 to cause a gate turn on current flow in the gate 23 to turn on controlled rectifier 20, which would result in a current flow from terminal 13, through primary winding 17, junction 16, from anode 21 to cathode 22 of controlled rectifier 20, through lead 14, and back to terminal 12. Thus the output of the bridge 50 controls the turn on of controlled rectifier 90, which in turn controls the turn on of the bidirectional or AC semiconductor switch comprising the parallel-inverse connected pair of controlled rectifiers 20 and 25.

When controlled rectifiers 20 and 25 are turned on by the signal from controlled rectifier 90 resulting from the change in impedance of bridge 50, the effect will be to substantially shunt primary winding 31 of voltage transformer T1. This shunting in effect removes voltage from the voltage regulator, which in turn removes voltage from bridge 50 which, if not replaced, would result in the loss of gate-on signal. However, as noted above, the current which flows through controlled rectifiers 20 or 25 must also flow through primary winding 17 of current transformer T2. This is the load current which will also flow through load 11, and is chosen to be significantly greater than the current that flows through load 11 when primary winding 31 is not shunted. This current through primary winding 17 will result in a voltage drop across secondary winding 18 of current transformer T2 selected to be equivalent to the voltage drop across secondary winding 32 of voltage transformer T1 when the thermostat is off. It can be seen that the voltage across secondary winding 18 is rectified by diodes 64 and 65, and is connected to the voltage regulator to replace the voltage lost by the shunting of primary winding 31 of transformer T1. Thus power is again supplied to the voltage regulator and regulated voltage is kept across bridge 50 to sustain the control signal.

In addition it may be noted that heater 59 which is connected across secondary winding 18 of current transformer T2 will now be energized to provide anticipatory heat to temperature responsive resistor 58.

The thermostat is now in the "on" condition and will continue to provide power to the load 11 until there has been a significant change in ambient temperature surrounding temperature responsive resistor 58, including the anticipatory heat provided from heater 59. Until this significant change in temperature, the output of bridge 50, since capacitor 86 is unable to charge significantly, will continue to keep transistor 95 off at the start of each sequential pulse of pulsating DC voltage, to thus allow the turn on of controlled rectifier 90 and provide gate on current for controlled rectifiers 20 or 25. The continued turn on of controlled rectifiers 20 or 25 will keep primary winding 31 of voltage transformer T1 shunted, and will allow an increased load current through load 11 which will also be felt through primary winding 17 of current transformer T2 to thus continue to provide regulated power to condition responsive bridge 50.

As the ambient temperature surrounding temperature responsive resistor 58 increases, including the anticipatory heat from heater 59, the resistance of temperature responsive resistor 58 will increase. This action will cause a decrease in the potential of the output terminal 54 with respect to output terminal 53, and will continue until such time as output terminal 53 becomes positive with respect to output terminal 54. At that time there will be a forward bias current flowing from output terminal 53, through lead 62, from base 98 to emitter 96 of transistor 95, through lead 61, and back to output terminal 54. Eventually this forward bias current will become sufficient to turn on transistor 95 at the start of a pulsating DC voltage. With transistor 95 on, the current flow will again pass from junction 82, through resistor 84, from collector 97 to emitter 96 of transistor 95, and back to junction 81. This will again shunt the gate input of controlled rectifier 90 to keep it off. As a result, a current will again flow through resistors 83 and 67 to base 98 of transistor 95 to keep transistor 95 on, and continue to prevent turn on of controlled rectifier 90. As a further result the capacitor 86, since it is no longer shunted, will charge through resistor 85 and on the subsequent pulse of pulsating DC voltage will have a significant charge to more easily cause the turn on of transistor 95. If controlled rectifier 90 is thus held off, there will again not be a significant gate current flow to turn on controlled rectifiers 20 or 25. Thus primary winding 31 of voltage transformer T2 will no longer be shunted and will again have a sufficient voltage drop to provide power to the voltage regulator and thus to bridge 50. With primary winding 31 back in the circuit, there will be a significant decrease in the current through primary 17 of current transformer T2, and the result will be an effective removal of the output of secondary winding 18. The removal of voltage across secondary winding 18 will also result in the loss of effect of heater 59.

It is apparent that the embodiment disclosed in the single figure of the drawing is a two-wire thermostat having a semiconductor switch, a built-in differential, and heat anticipation, which thermostat uses a voltage transformer to provide power when the switch is off, and a current transformer in series with the switch to provide power when the switch is on.

It will be obvious that the general principles herein disclosed may be embodied in many forms other than that specifically disclosed without departing from the spirit of the invention as defined in the following claims.

What is claimed is:

1. In a temperature responsive control apparatus in which a bistable control switch means is effective to control power to load means, said switching means including means for establishing an on-off differential is controlled by a signal from a condition responsive bridge having temperature responsive means in one arm, and in which a voltage regulator providing regulated power to the bridge receives power through rectification means connected to a secondary winding of a voltage transformer that has a primary winding connected directly across the bistable control switch means, and source terminals adapted to be connected to a source of bidirectional power and a load means, the improvement comprising:
    a current transformer having primary and secondary windings;
    means serially connecting said current transformer primary winding and the bistable control switch means across said source terminals;
    further rectification means connecting said current transformer secondary winding to the voltage regulator to provide power for the condition responsive bridge when the bistable control switch means is on;
    heater means adapted to provide anticipatory heat to the temperature responsive means in the one arm of the condition responsive bridge;
    and means connecting said heater means to be energized by said current transformer secondary winding.

2. In a condition control apparatus in which a voltage transformer provides power to a voltage regulator that is connected to a condition responsive bridge, which bridge provides a signal to control switch means, and in which a primary winding of the voltage transformer is connected across the switch means, power input terminals adapted to be connected to a source of bidirectional power in series with a load, the improvement for providing power to the voltage regulator when the turn-on of the switch means removes power from the voltage transformer comprising:
    a current transformer having primary and secondary windings;
    means serially connecting the switch means and said current transformer primary winding across said power input terminals;
    and means connecting said current transformer secondary winding to the voltage regulator.

3. In the condition control apparatus of claim 2 in which the condition responsive bridge includes an arm having a temperature responsive element, the combination comprising:
    a heater element mounted in proximity to the temperature responsive element;
    and means connecting said heater element to said current transformer secondary winding so that said heater element provides anticipatory heat to said temperature responsive element when the switch means is on.

4. Condition control apparatus comprising:
    a pair of power input terminals adapted to be connected to a source of bidirectional power in series with a load;
    control switch means;
    signal forming means connected to provide a signal to said control switch means;
    a voltage transformer having a primary winding connected directly across said control switch means and having a secondary winding connected to provide power to said signal forming means when said control switch means is off;
    and a current transformer having a primary winding connected serially with said control switch means across said power input terminals and having a secondary winding connected to provide power to said signal forming means when said control switch means is on.

5. Two wire semiconductor control apparatus comprising:
    a pair of power input terminals adapted to be connected across a source of AC power in series with a load;
    a voltage transformer and a current transformer, each having a primary and a secondary winding;
    bidirectional semiconductor switch means;
    means serially connecting said current transformer primary winding and said bidirectional semiconductor switch means across said pair of power input terminals;
    means connecting said voltage transformer primary winding across said bidirectional semiconductor switch means;
    a control signal circuit including differential establishing means and connected to control said bidirectional semiconductor switch means;
    a condition responsive bridge having input terminals and output terminals;
    means connecting said bridge output terminals to said control signal circuit;
    a voltage regulator having input terminals and output terminals;
    means connecting said voltage regulator output terminals across said bridge input terminals;
    means connecting said voltage transformer secondary winding to said voltage regulator input terminals to provide power to said voltage regulator when said bidirectional semiconductor switch means is off;
    and further means connecting said current transformer secondary winding to said voltage regulator input terminals to provide power to said voltage regulator when said bidirectional semiconductor switch means is on.

6. The apparatus of claim 5 in which said condition responsive bridge has an arm containing a temperature responsive element, and in which a heater element is mounted in proximity to said temperature responsive element and is connected to be energized by said current transformer secondary winding to provide heat anticipation for the thermostat.

7. A two wire thermostat comprising:
    a pair of power input terminals adapted to be connected across a source of AC power in series with a load;
    a voltage transformer and a current transformer, each having a primary and a secondary winding;
    a pair of parallel-inverse connected controlled rectifiers each having a gate electrode;
    means serially connecting said current transformer primary winding and said pair of parallel-inverse connected controlled rectifiers across said pair of power input terminals;

means connecting said voltage transformer primary winding across said pair of parallel-inverse connected controlled rectifiers;

a gate signal circuit including differential establishing means and connected across said pair of parallel-inverse connected controlled rectifiers;

means connecting said gate signal circuit to said gate electrodes to control the on-off states of said controlled rectifiers;

a condition responsive bridge having input terminals and output terminals;

means connecting said bridge output terminals to said gate signal circuit;

a voltage regulator having input terminals and output terminals;

means connecting said voltage regulator output terminals across said bridge input terminals;

rectification means connecting said voltage transformer secondary winding to said voltage regulator input terminals to provide power to said voltage regulator when said pair of controlled rectifiers are both off;

and further rectification means connecting said current transformer secondary winding to said voltage regulator input terminals to provide power to said voltage regulator when one of said pair of controlled rectifiers is on.

8. The thermostat of claim 7 in which said condition responsive bridge has an arm containing a temperature responsive element, and in which a heater element is mounted in proximity to said temperature responsive element and is connected to be energized by said current transformer secondary winding to provide heat anticipation for the thermostat.

References Cited

UNITED STATES PATENTS

| | | | |
|---|---|---|---|
| 3,305,766 | 2/1967 | Gambill | 323—22 |
| 3,303,414 | 2/1967 | Jensen | 323—22 |
| 3,207,975 | 9/1965 | Pintell | 323—22 |
| 3,159,737 | 12/1964 | Dora | 219—501 |
| 3,146,392 | 8/1964 | Sylvan | 323—22 |
| 3,107,324 | 10/1963 | Wright et al. | 323—68 |
| 2,546,926 | 3/1951 | Hart | 323—33 |

JOHN F. COUCH, *Primary Examiner.*

M. L. WACHTELL, W. M. SHOOP, *Assistant Examiners.*